(12) United States Patent
Calkins et al.

(10) Patent No.: US 7,270,139 B2
(45) Date of Patent: Sep. 18, 2007

(54) CAM-ASSISTED, WEDGE ACTUATED, METAL-TO-METAL SEAL, BLOCK AND BLEED PLUGGING TOOL

(75) Inventors: Charles D. Calkins, Tulsa, OK (US); Harvey A. Ugland, Sapulpa, OK (US); Buddy A. Wilson, Sapulpa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 340 days.

(21) Appl. No.: 11/113,550

(22) Filed: Apr. 25, 2005

(65) Prior Publication Data

US 2006/0237060 A1   Oct. 26, 2006

(51) Int. Cl.
B23B 41/08 (2006.01)

(52) U.S. Cl. ............... 137/15.12; 137/317; 138/94; 138/97

(58) Field of Classification Search ........... 137/15.12, 137/15.14, 317, 318, 319; 138/94, 94.5, 138/97
See application file for complete search history.

(56) References Cited

U.S. PATENT DOCUMENTS

| 3,170,226 A | 2/1965 | Larry |
| 3,599,663 A | 8/1971 | VerNooy |
| 3,614,252 A | 10/1971 | Rose et al. |
| 3,626,475 A | 12/1971 | Hicks |
| 3,665,966 A | 5/1972 | VerNooy |
| 3,785,041 A | 1/1974 | Smith |
| 3,872,880 A | 3/1975 | VerNooy et al. |
| 4,411,459 A | 10/1983 | VerNooy |
| 4,579,484 A | 4/1986 | Sullivan |
| 4,880,028 A | 11/1989 | Osburn et al. |
| 5,439,331 A | 8/1995 | Andrew et al. |
| 5,443,095 A | 8/1995 | Glossop, Jr. |
| 5,531,250 A | 7/1996 | Freeman et al. |
| 5,612,499 A | 3/1997 | Andrew et al. |
| 5,690,139 A * | 11/1997 | Murphy et al. ............. 137/317 |
| 6,012,878 A | 1/2000 | Hicks |
| 6,588,455 B1 * | 7/2003 | Welfare ................... 138/94.5 |
| 6,745,791 B2 * | 6/2004 | Beals et al. .................. 137/317 |

FOREIGN PATENT DOCUMENTS

GB     1064398     4/1967
WO   WO 2004/099661 A1   11/2004

* cited by examiner

*Primary Examiner*—Kevin Lee
(74) *Attorney, Agent, or Firm*—Gable Gotwals

(57) ABSTRACT

A system and method of plugging a pipe including sealably securing onto the exterior of a pipe first and second spaced apart collars, each collar having a sealing face in a plane perpendicular the pipe axis, cutting and removing a length of pipe from between the collars leaving two open pipe ends, positioning first and second seal cups between the collars, each seal cup having a forwardly extending circumferential lip of internal diameter greater than the external diameter of the pipe, each seal cup having top and bottom cam followers, moving cam surfaces against the cam followers to guide the seal cups into sealing engagement with the sealing faces of the collars, and forcing a wedge between rearward surfaces of the seal cups.

8 Claims, 8 Drawing Sheets

To Fig. 4B

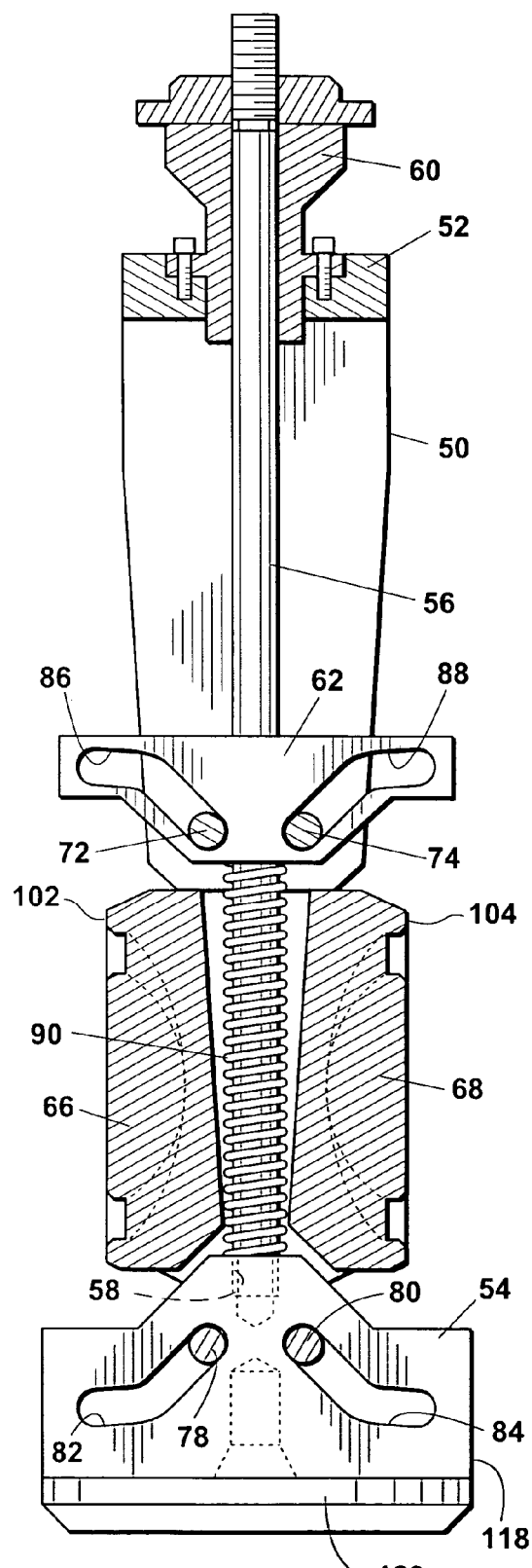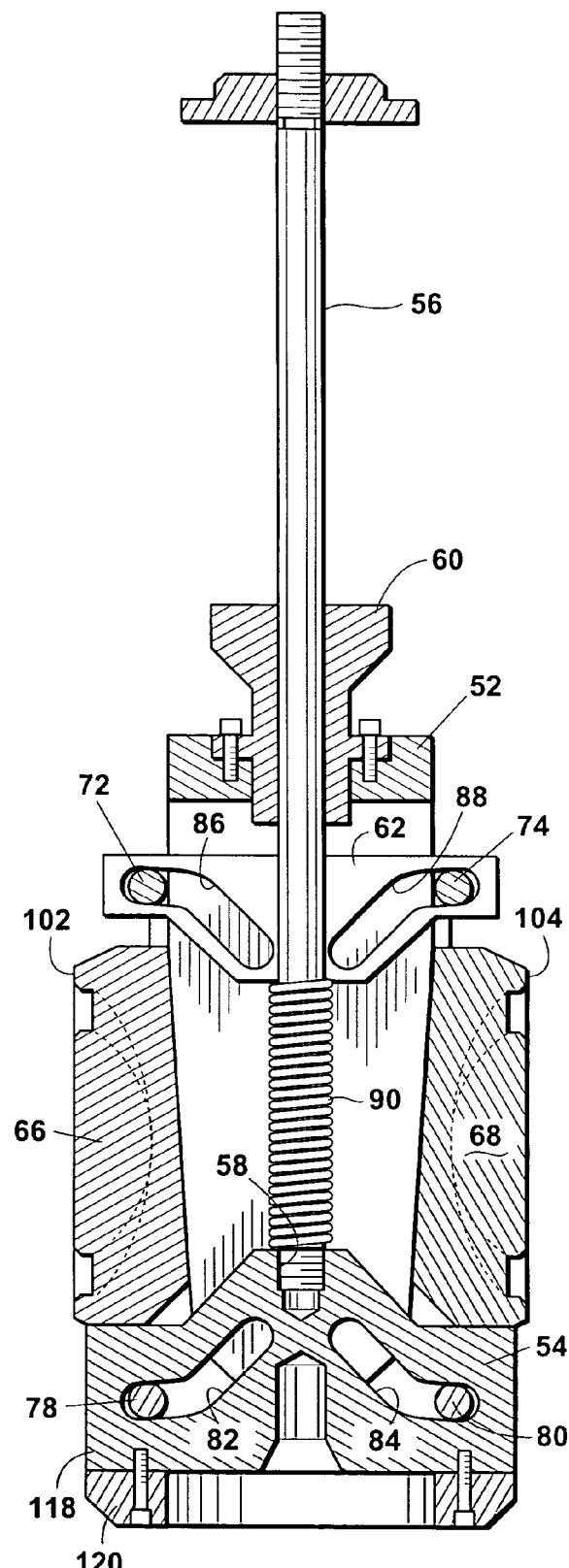
*Fig. 5*　　*Fig. 6*

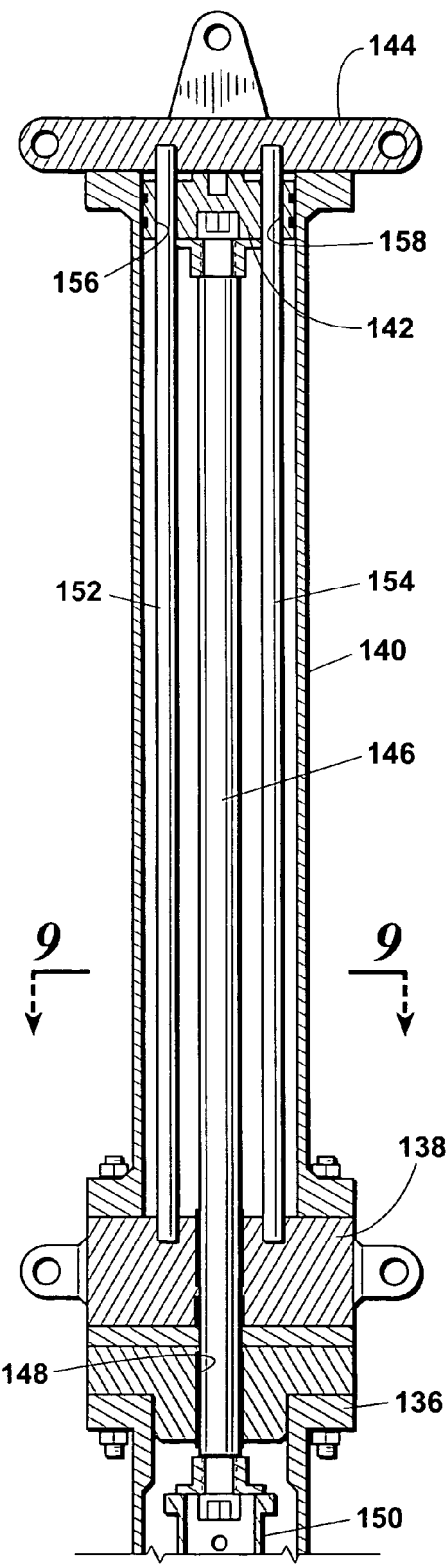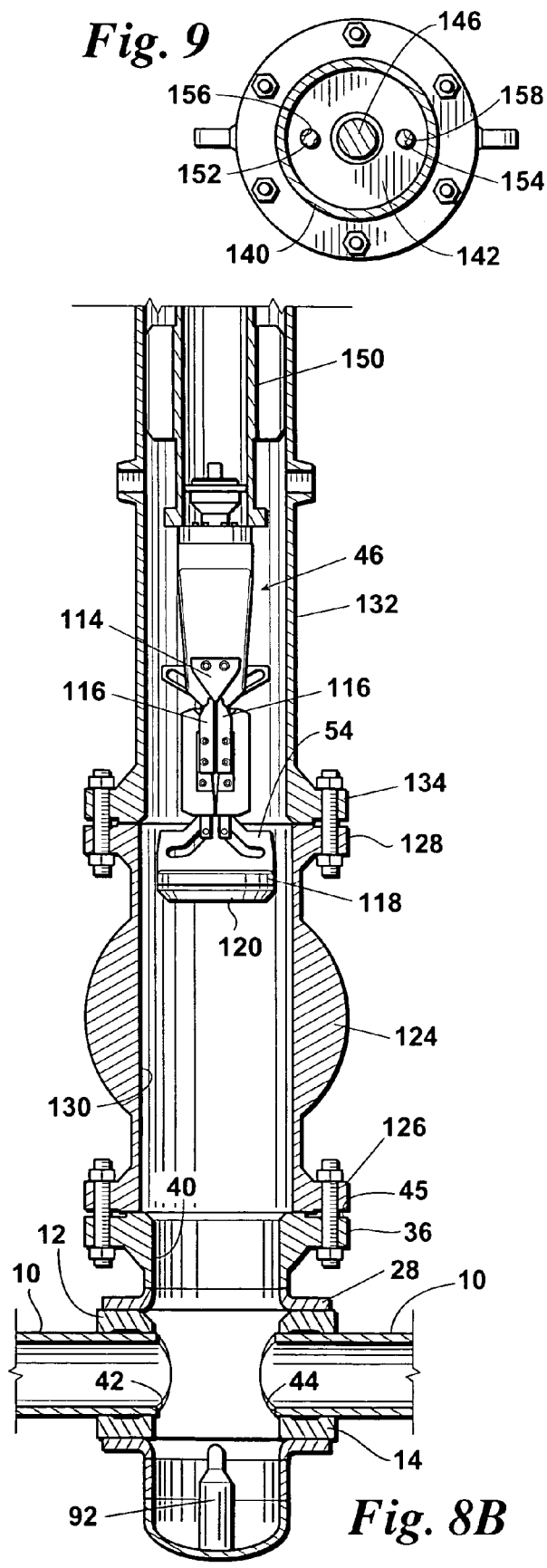
*Fig. 8A*  *Fig. 8B*  *Fig. 9*

CAM-ASSISTED, WEDGE ACTUATED, METAL-TO-METAL SEAL, BLOCK AND BLEED PLUGGING TOOL

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

This invention relates to apparatus systems and methods for plugging a pipe or pipeline having high temperature liquids or gases flowing therethrough.

BACKGROUND OF THE INVENTION

This invention relates to cam guided systems and methods for plugging a pipe under pressure, and is particularly applicable for plugging a pipe, or pipeline having therein high temperature liquids or gases. "Pipe" as used hereinafter is inclusive of any tubular member made of metal for carrying fluid (liquids or gases).

The invention described herein is a cam-assisted, wedge actuated, double block and bleed, metal-to-metal high temperature valve.

Machines for tapping an opening in a pipe are well-known. Prior issued U.S. patents for tapping machines include U.S. Pat. No. 3,614,252 entitled TAPPING APPARATUS; U.S. Pat. No. 4,579,484 entitled UNDER WATER TAPPING MACHINE; U.S. Pat. No. 4,880,028 entitled COMPLETION MACHINES; U.S. Pat. No. 5,439,331 entitled HIGH PRESSURE TAPPING APPARATUS; U.S. Pat. No. 5,612,499 entitled METHOD OF INSERTING A SENSOR INTO A PIPELINE and U.S. Pat. No. 6,012,878 entitled PRESSURE BALANCED SUBSEA TAPPING MACHINE.

Tapping machines, such as the kind described in the above-mentioned U.S. patents, are for tapping a hole in a pipe while liquids or gases are flowing through them, that is, while the pipe is under pressure. Tapping procedures of this type are customarily carried out primarily for one of two purposes, that is, to provide a branch fitting on the pipe or to enable fluid flow through the pipe to be blocked. Other examples of prior art that describe and illustrate plugging the interior of a pipe usually associated with first tapping the pipe, include the following United States patents:

BRIEF SUMMARY OF THE INVENTION

The invention described herein is a cam-assisted, wedge actuated, double block and bleed, metal-to-metal, high temperature plugging tool.

The invention herein makes use of the known technology of welding onto a pipe having fluid flow therethrough a pair of collars. Each of the collars is a toroidal that is severed to provide a set of two toroidal halves that are fitted together around the pipe. Each collar set consisting of two spaced apart parallel collars are first secured to the exterior of the pipe. Each collar has a machined face which can be achieved by machining and grinding before the collars have been welded to the pipe. Thus a set of collars affixed to the exterior surface of a pipe provide forward planar faces that face each other. The collar faces are parallel to each other and spaced apart an accurately establish distance. After each collar is affixed to the pipe, the collar halves are then welded to each other. Further, the two halves of each collar are welded where the back face meets the pipe around the 360° circumference of the pipe. After the collars are installed, they provide uninterrupted circumferentially planar sealing surfaces that face each other. The sealing surfaces are parallel to each other and in radial planes perpendicular to longitudinal axis of the pipe.

After the collars are welded to the exterior surface of a pipe containment fittings are welded to the collars to provide a housing of internal dimensions greater than the external surface of the pipe. The containment housing has a bottom usually in the form of a cup-shaped member and a flange fitting at the upper end. After the containment housing, including the bottom member and the upper flange have been welded to the collars, the containment housing is typically pressure tested to ensure there are no leaks and that the collars and the containment housing have the structural integrity to contain the maximum pressure to which they will be subjected.

After the collars and the containment housing components have been installed and tested, a valve is secured to the containment housing flange. A tapping machine system, well known in the industry, is secured to the upper surface of the valve and then pressure is applied to test for leaks. Thereafter, by use of the tapping machine, a complete section of the pipeline is removed from between the collars. The concept of removing a complete section rather than tapping only a hole in the pipe is illustrated in U.S. Pat. No. 5,612,499 entitled "Method of Inserting A Sensor Into A Pipeline". When a section of the pipeline has been cut, it is

| PATENT NO. | INVENTOR | TITLE |
|---|---|---|
| U.S. Pat. No. 3,170,226 | Allan | Line Stopping and Valve Inserting Apparatus and Method |
| U.S. Pat. No. 3,599,663 | Ver Nooy | Hot Tapping Apparatus |
| U.S. Pat. No. 3,626,475 | Hicks | High Temperature Pipe-Plugging Apparatus |
| U.S. Pat. No. 3,665,966 | Ver Nooy | Pipe Plugger |
| U.S. Pat. No. 3,785,041 | Smith | Method For Plugging Pipe |
| U.S. Pat. No. 3,872,880 | Ver Nooy et al. | Plugging Apparatus |
| U.S. Pat. No. 4,411,459 | Ver Nooy | Branch Fitting for Providing Access to the Interior of a Pipe |
| U.S. Pat. No. 5,443,095 | Glossop, Jr. | Fluid Blocking Device |
| U.S. Pat. No. 5,531,250 | Freeman et al. | Device for Plugging the Interior of a Pipe |
| GB1,064,398 | Pass and Co. Ltd. | Pipe Line Plugger |
| WO2004/099661 | TDW Delaware, Inc. | Apparatus, Systems and Methods For Plugging A High Temperature Pipe | removed exposing the opposed ends of the cutout section of the pipeline, the exposed ends being surrounded by the collars that have previously been attached to the pipe.

After the collars and the containment housing have been affixed to the exterior of the pipe, and a tapping machine attached and a section of the pipe cut and removed, the next step is to seal the opposed ends of the pipe employing a plugging tool that is the subject of the present disclosure. The plugging tool is inserted as an assembly into the interior of the containment housing. The tool contains opposed sealing cups, each having a circumferential sealing surface of internal diameter greater than the external diameter of the pipe. The plugging tool assembly is lowered into the containment housing and actuated such that the opposed sealing cups are advanced in directions towards the open ends of a severed pipe and towards the opposed planar circumferential sealing surfaces provided by the collars.

The plugging tool assembly includes upper and lower cam followers affixed to each of the seal cups rearwardly of the forward faces thereof. Top and bottom supports each having a pair of cam slots for receiving the cam followers and are configured to urge the seal cups towards the toroidal sealing surfaces on the collars. The plugging tool assembly includes translation apparatus for moving the top and bottom supports toward and away from each other to thereby urge the seal cups towards and away from the toroidal collar sealing surfaces.

A pair of wedge members are forced against rearward surfaces of the seal cups to simultaneously force them into metal-to-metal sealing contact with the sealing surfaces formed on the toroidal collars. In this manner a double block and bleed, metal-to-metal seal, high temperature plugging tool is achieved. After the seal cups are forced into sealing condition the interior of the containment housing can be tested to verify that both seal cups are in leak-proof contact with the toroidal collars.

The sealing assembly is moved into or out of the containment housing by means of a hydraulic cylinder with a piston therein and a piston rod extending sealably from the hydraulic cylinder. The plugging tool assembly is supported by the piston rod. It is important that the plugging assembly be accurately positioned within the housing and therefore the piston rod that holds the assembly must be non-rotatably secured with respect to the housing. For this purpose, a type of hydraulic cylinder/piston assembly is provided in an arrangement that rotationally fixes the piston and piston rod with respect to the cylinder, that is, it allows the piston rod to be axially displaced relative to the cylinder but prevents the piston rod from rotating about its axis relative to the cylinder axis.

A better understanding of the invention will be obtained from the following detailed description of the preferred embodiments and claims taken in conjunction with the attached drawings.

BRIEF DESCRIPTION OF THE DRAWINGS

FIG. 5 is a partial cross-sectional view of the plugging assembly shown in its non-actuated condition with the sealing cups withdrawn towards each other.

FIG. 6 is a view as in FIG. 5 of the plugging assembly shown in its actuated condition with the sealing cups moved outwardly away from each other so as to perform a sealing function within a containment housing.

FIG. 8A is an upper portion of the apparatus used for installing the plugging assembly into a containment housing and showing, in cross-section, the arrangement of a piston within a cylinder wherein the piston is supported in a manner that allows axial displacement but that prevents rotational displacement relative to the cylinder.

FIG. 8B is a cross-sectional view of a lower portion of the apparatus of FIG. 8A showing the plugging assembly secured to the lower end of a piston actuated mechanism by which the assembly can be positioned into or removed from the interior of a confinement housing.

FIG. 9 is a cross-sectional view taken along the line 9-9 of FIG. 8A showing a cylinder and a piston rod and showing guide rods by which the piston, as seen in FIG. 8A, and therefore the piston rod are guided in a way to prevent axial rotation.

DETAILED DESCRIPTION OF THE PREFERRED EMBODIMENTS

Figure 1:
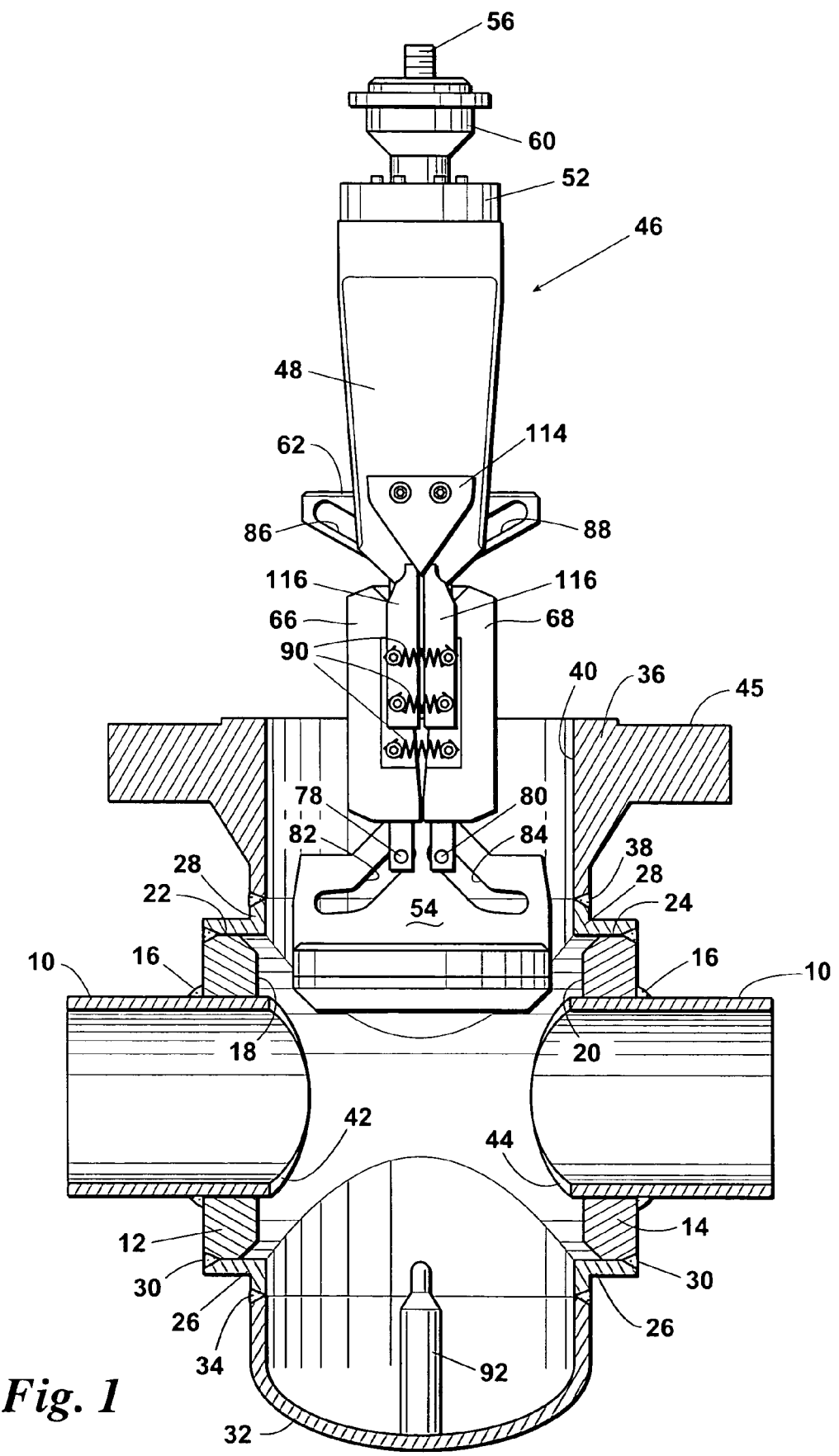
FIG. 1 is an elevational cross-sectional view of portions of the length of a pipeline having affixed to it a set of collars and a containment housing in which a portion of the pipeline between the collars has been removed. Shown positioned partially within the containment housing, in external view, is a cam-actuated plugging assembly that is the basic subject of this invention.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements illustrated in the drawings are identified by the following numbers:

| | |
|---|---|
| 10 | Pipeline |
| 12 | First collar |
| 14 | Second collar |
| 16 | Welds |
| 18 | First collar inner face |
| 20 | Second collar inner face |
| 22 | External circumferential surface of collar 12 |
| 24 | External circumferential surface of collar 14 |
| 26 | Lower containment housing portion |
| 28 | Upper containment housing portion |
| 30 | Welds |
| 32 | End cap |

-continued

| | |
|---|---|
| 34 | Weld |
| 36 | Flange member |
| 38 | Weld |
| 40 | Passageway |
| 42 | Pipe end |
| 44 | Pipe end |
| 45 | Upper surface |
| 46 | Pipe sealing assembly |
| 48 | First wedge member |
| 50 | Second wedge member |
| 52 | Top plate |
| 54 | Lower support |
| 56 | Shaft |
| 58 | Threaded opening |
| 60 | Shaft guide |
| 62 | Top support |
| 64 | Passageway |
| 66 | First seal cup |
| 68 | Second seal cup |
| 70 | Upper arms |
| 72 | First roller |
| 74 | Second roller |
| 76 | Downward arms |
| 78 | Lower roller |
| 80 | Lower roller |
| 82 | Cam slot |
| 84 | Cam slot |
| 86 | Cam slot |
| 88 | Cam slot |
| 90 | Springs |
| 92 | Stop post |
| 94 | Front surface of the first seal cup |
| 96 | Circumferential recess |
| 98 | Front surface |
| 100 | Circumferential recess |
| 102 | Circumferential sealing surface |
| 104 | Circumferential sealing surface |
| 106 | Brackets |
| 108 | Rollers |
| 110 | Back surfaces of the wedge members |
| 112 | Forward surfaces of the wedge members |
| 114 | Divider guide |
| 116 | Runners |
| 118 | Guide disc |
| 120 | Guide ring |
| 122 | Recess |
| 124 | Valve |
| 126 | Lower flange |
| 128 | Upper flange |
| 130 | Passageway |
| 132 | Adapter casing |
| 134 | Lower flange |
| 136 | Upper flange |
| 138 | Adapter |
| 140 | Hydraulic cylinder |
| 142 | Piston |
| 144 | Closure member |
| 146 | Piston rod |
| 148 | Sealable opening |
| 150 | Tubular piston rod extender |
| 152 | Guide rod |
| 154 | Guide rod |
| 156 | First passageway in the piston |
| 158 | Second passageway in the piston |

Figure 7:
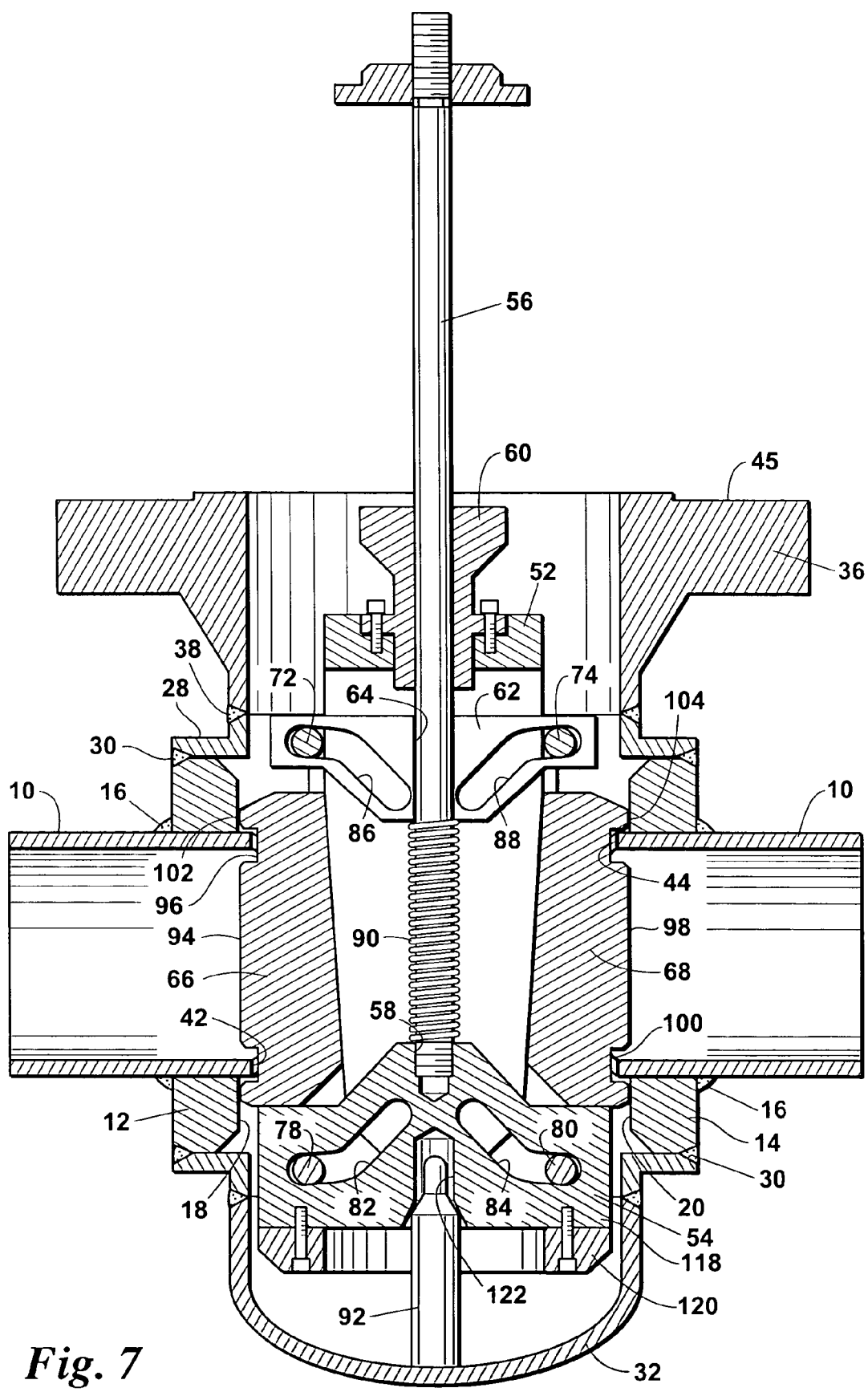
FIG. 7 is a cross-sectional view of a containment housing with collars affixed to the exterior length of a pipe and a portion of the pipe having been removed as shown in FIG. 1 and showing the plugging assembly having been inserted into the containment housing and the sealing cups forced outwardly into seal relationship with the collars.

Referring to the drawings and first to FIG. 1, the first step in practicing the systems and methods of this invention is to affix a first collar, generally indicated by the number 12 to the exterior of pipe 10. Then a second, spaced apart, collar 14 is affixed to the pipe. Each of collars 12 and 14 are made up of two semi-circular pieces. Each of the collars is geometrically shaped as a toroidal. While not seen in the drawings, collars 12 and 14 are each formed of an upper half and a lower half that are positioned on pipe 10. The collar halves are then welded to each other and to the pipe 10, the welds to pipe 10 being indicated by reference numeral 16. In FIGS. 1 and 7, welds 16 are shown only on exterior faces of collars 12 and 14 although interior welds can in like manner be applied. Welds 16 extend around the full interior of the toroidal collars 12 and 14 and around the complete external circumference of pipe 10. In addition, though not seen in the drawings, the upper and lower halves of each of the collars 12 and 14 are welded to each other so that the collars 12 and 14 become unitary. The collars are spaced apart from each other at an accurately determined distance and are each in a radial plane perpendicular of the longitudinal axis of pipe 10.

Collar 12 has an inner face 18 that is circumferential and uninterrupted around pipe 10 and second collar 14 has a matching circumferential inner face 20. In the practice of this invention it is important that the inner faces 18 and 20 be parallel to each other and spaced apart an accurate pre-determined distance. For this reason, a cradle-like structure (not shown) can be used to support the upper and lower halves of each of the collars as they are being positioned on and secured to the pipe.

After collars 12 and 14 have been accurately positioned and welded to pipe 10, a containment housing is affixed to the external circumferential surface 22 of collar 12 and the matching external circumferential surface 24 of collar 14. This housing typically consists of a lower containment housing portion 26 and a mating upper containment housing portion 28. These upper and lower containment housing portions are secured to collars 12 and 14 by welds 30 and the collar portions are welded to each other. To close the open bottom of lower containment housing portion 26 an end cap 32 is employed, the end cap being welded to the lower containment housing portion 26 by a circumferential weld 34. In a similar manner, the open upper containment housing portion 28 receives a flange member 36, the flange being secured to the upper containment housing portion 28 by a circumferential weld 38. The flange member 36 has a passageway 40 therethrough.

With collars 12 and 14 in place, with the upper and lower containment housing portions 26 and 28 welded to them and with end cap 32 and flange member 36 welded to the housing portions, a short section of the length of pipe 10 is fully enclosed.

After the components that have been described are in place as illustrated in FIGS. 1 and 7, the next step in preparing the pipe to be closed is to remove a section of the pipe. This is accomplished by attaching a tapping machine (not shown) to the upper surface 45 of flange 36 using a procedure that is known in the industry. A tapping machine has provision for guiding a circular saw down through the passageway 40 to engage pipe 10. The circular saw cuts out a section of pipe 10 leaving the pipe ends 42 and 44 exposed. The removed section of the pipe 10 is extracted from within the housing. The pipe is then ready to be closed off by employing a pipe sealing assembly of this invention that will now be described.

Figure 3:
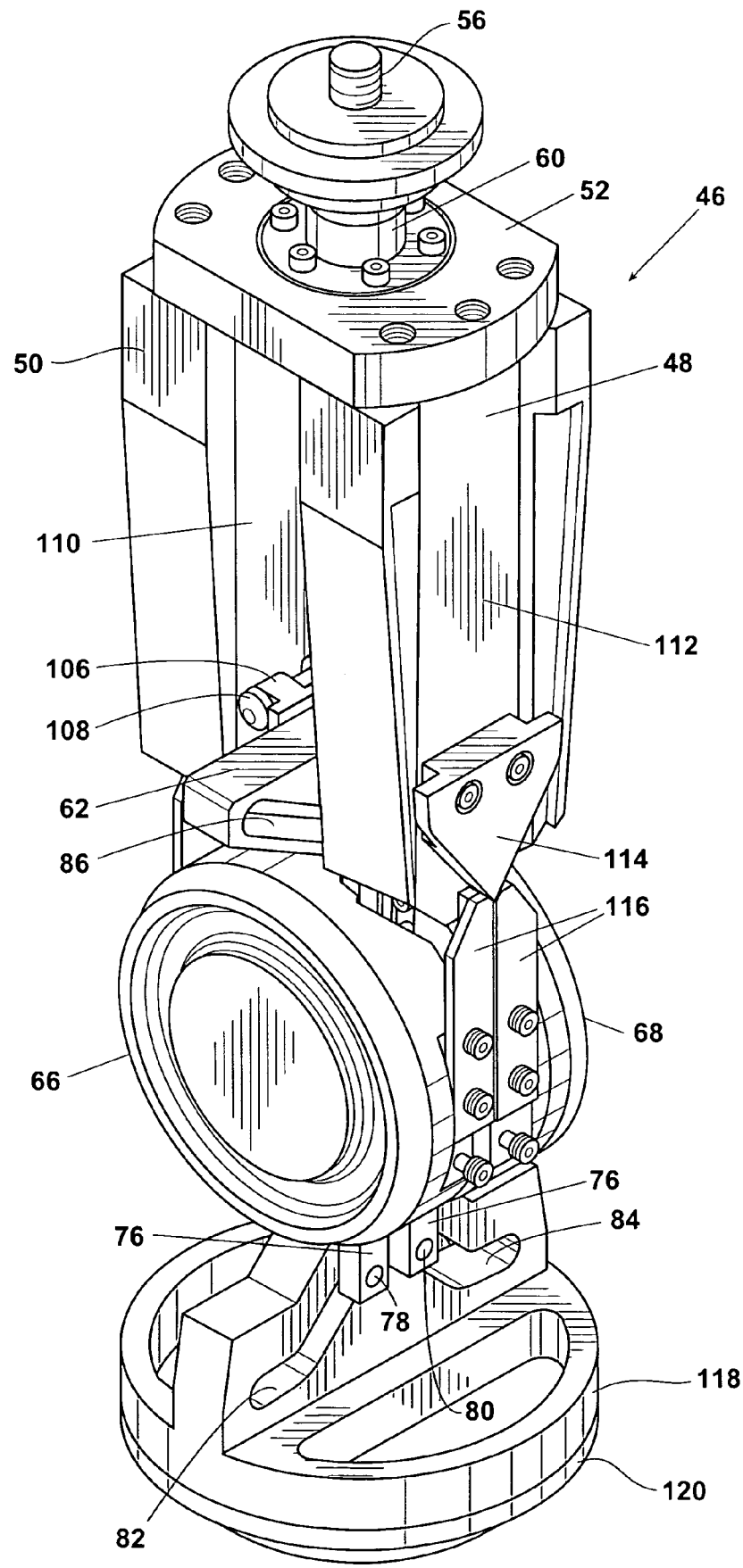
FIG. 3 is an isometric external view of the plugging assembly in its non-operated state, that is, in the state as it would appear prior to being inserted into a housing for closing the opposed ends of a pipe.
Figure 4A:
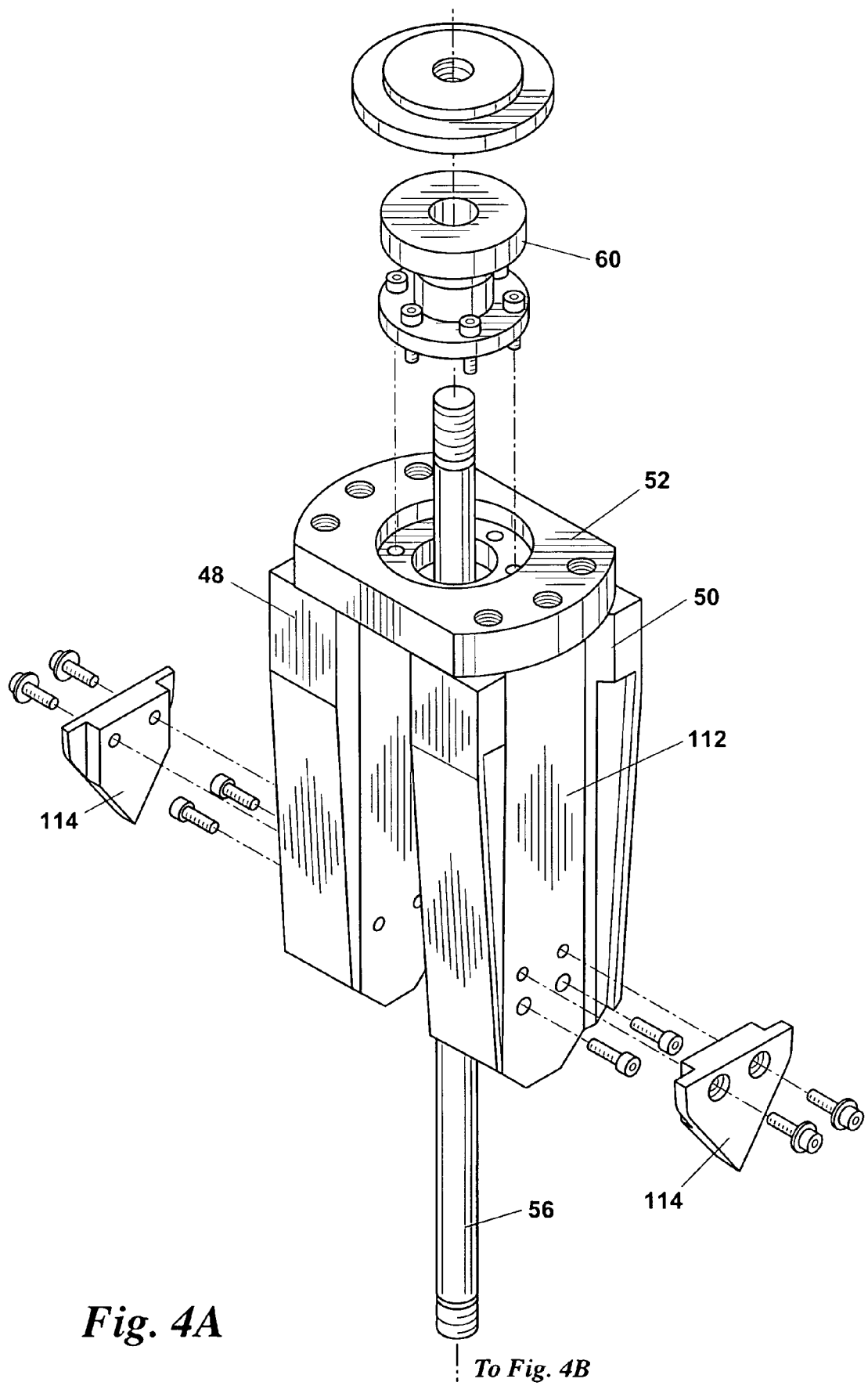
FIG. 4A is an exploded external view of the plugging assembly body with guide portions that are attached to it.
Figure 4B:
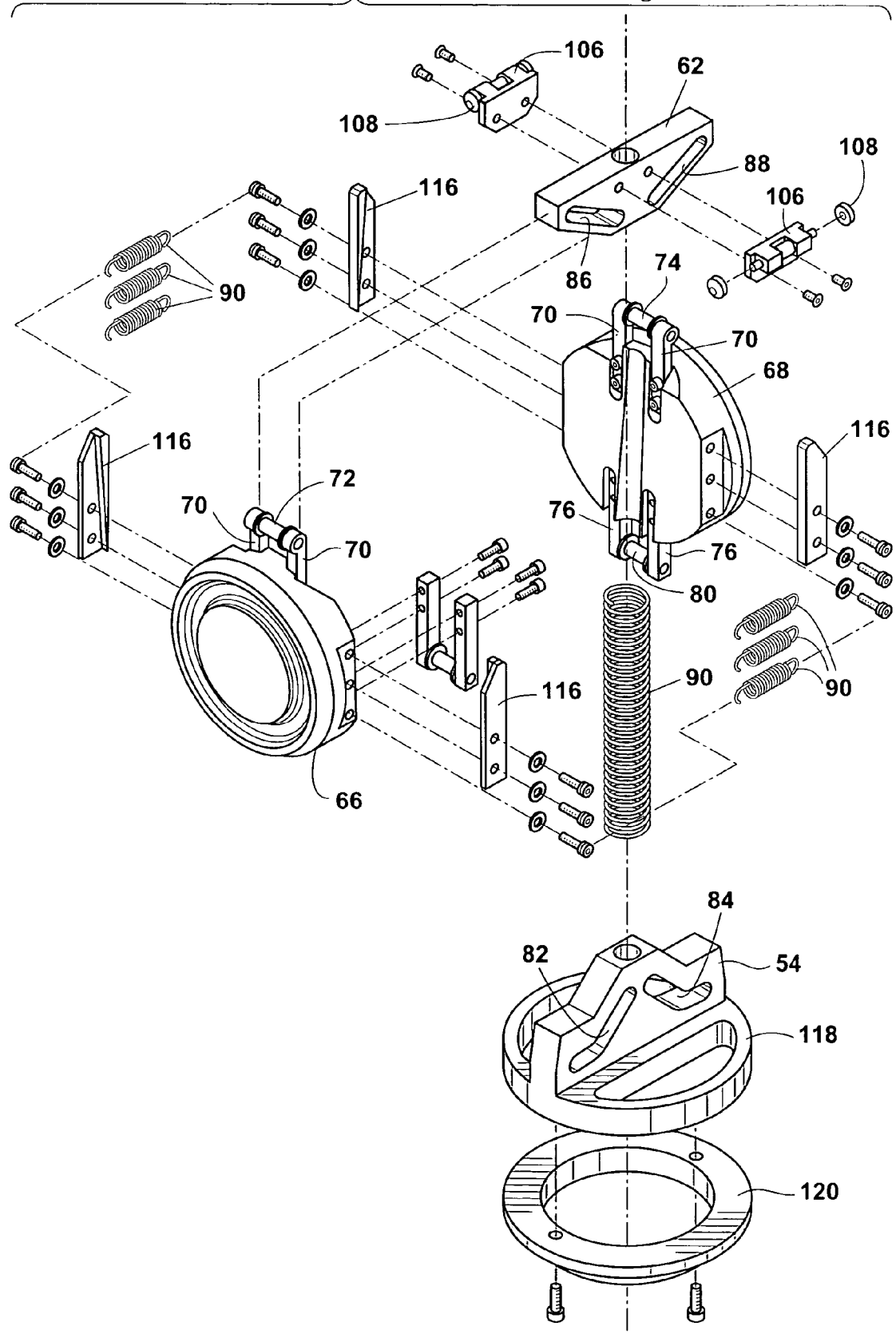
FIG. 4B is a further exploded view of components that, together with the body portion as shown in FIG. 4A, complete the plugging assembly.

Looking first at FIG. 3, the pipe sealing assembly 46 includes first and second wedge members 48 and 50 that are held together at the top by a plate 52 and, at the bottom, by a lower support 54 that has a portion extending between the lower ends of the wedge members and as best seen in FIGS. 4B, 5 and 6.

As seen in FIGS. 4, 5, 6 and 7 an elongated shaft 56 extends between wedge members 48 and 50. Shaft 56 is threaded at its lower end and engages a threaded opening 58 in the top of lower support 54. A shaft guide 60 has a central opening therethrough slidably receiving shaft 56, the shaft guide being secured by bolts to an upper surface of top plate 52. Slidably positioned between wedge members 48 and 50 is a top support 62 that, as seen in FIG. 7, has a passageway 64 therethrough that slidably receives shaft 56.

Positioned with respect to wedge members 48 and 50 is a first seal cup 66 and an opposed second seal cup 68. As seen in FIG. 4B, seal cup 66 has upwardly extending arms 70 that support a first roller 72. Seal cup 68 has upwardly extending arms 70 that supports a second roller 74.

First seal cup 66 has downwardly extending arms 76 that support a lower roller 78 and second seal cup 68 has similar downwardly extending arms that support a lower roller 80.

Lower support 54 has a pair of cam slots 82 and 84 that receives lower rollers 78 and 80 respectfully. In like manner, top support 62 has a pair of cam slots 86 and 88 that receives upper rollers 72 and 74 respectfully. It can be seen that when top support 62 is moved in a direction towards lower support 54 that rollers 72, 74, 78 and 80 acting in cam slots 82, 84, 86 and 88 serves to deflect seal cups 66 and 68 away from each other and contrarily when top support 62 moves away from lower support 54 the action between the rollers and cam slots retract the seal cup towards each other. Seal cups 66 and 68 are resiliently restrained towards each other by springs 90 as illustrated in FIG. 4B. Springs 90 are not shown in FIG. 3.

Received on shaft 56 and compressibly positioned between lower support 54 and top support 62 is a compression spring 90. The downward translation of shaft guide 60 and thereby top plate 52 and with it, first and second wedge members 48 and 50, forces the top support 62 towards lower support 54, compressing spring 90 and moving the top rollers 72 and 74 within the cams formed in top support 62 and the bottom rollers 78 and 80 within the cams formed in lower support 54. This cam action causes first and second seal cups 66 to displace outwardly with respect to each other. The downward movement of lower support 54 is limited by a stop post 92 affixed to the interior of end cap 32 as shown in FIGS. 7 and 8B.

First seal cup 66 has a front surface 94 having therein a circumferential recess 96. In like manner, second seal cup 68 has a front surface 98 with a circumferential recess 100. The function of recesses 96 and 100 is to receive the outer pipe ends 42 and 44 as the seal cups 66 and 68 are expanded outwardly. This allows a circumferential sealing surface 102 on cup 66 and a corresponding circumferential sealing surface 104 on the front face of seal cup 68 to engage first collar inner face 18 and second collar inner face 20 respectfully to form metal-to-metal seals. The circumferential metal-to-metal seal of first seal cup 66 against first collar inner face 18 closes the end 42 of pipe 10 and correspondingly, the circumferential metal-to-metal seal of second seal cup 68 against second collar inner face 20 closes the end 44 of pipe 10. Thus when the seals 66 and 68 are expanded away from each other, they close both exposed ends of pipe 10 in a metal-to-metal sealing arrangement effectively blocking fluid flow through the pipe. This achieves a double block and bleed plugging arrangement. With both seal cups 66 and 68 in simultaneous sealed conditions as shown in FIG. 7 the interior of the containment housing can be tapped to verify that both seal cups are in leak-proof closure.

Figure 2:
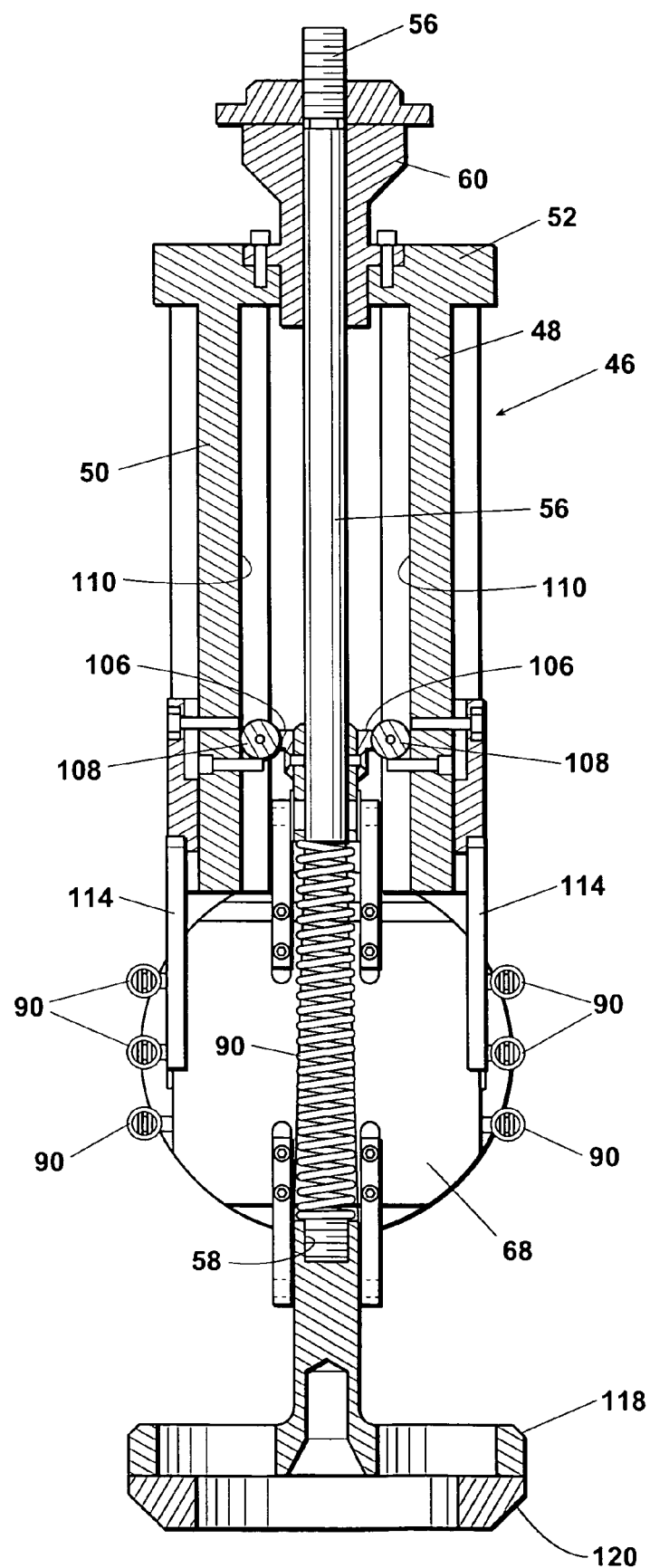
FIG. 2 is an enlarged cross-sectional view of the plugging assembly as shown in FIG. 1.

Affixed to opposite sides of top support 62 are opposed brackets 106, each having an axle with a pair of rollers 108. Rollers 108 roll against the back surfaces 110 (see FIG. 2) of each of wedge members 48 and 50. Brackets 106 and rollers 108 are seen in FIGS. 2, 3 and 4B. Only one bracket and one roller are seen in FIG. 3.

Affixed to the forward surface 112 of each of the wedge members 48 and 50 is a divider guide 114. Affixed to each of the seal cups 66 and 68 are a pair of runners 116, thereby being four runners 116. Each pair of runners 116 is engaged by a divider guide 114 as the wedge members 48 and 50 are moved downwardly during the process of installing pipe sealing assembly 46 within a housing between exposed pipe ends 42 and 44. Thus, the interaction of the divider guides 114 and runners 116 initiate displacement of seal cups 66 and 68 away from each other. The cam action provided by the cam slots formed in lower support 54 and top support 62 further assist in guiding the seal cups between their tool open and tool closed positions.

Lower support 54 that has cam slots 82 and 84 therein, has, shown integrally formed with it, a horizontal guide disc 118. Secured to the bottom of the guide disc is a guide ring 120. The guide disc/guide ring combination serves to guide the lower end of the assembly 46 as it is positioned within the housing and between the ends 42 and 44 of pipe 10. Further, there is recess 122 formed in the bottom of guide disc 118 and guide ring 120. Recess 122 receives stop post 92 when the assembly is forced downward into the housing. Stop post 92 defines the lower limit of travel of assembly 46 so that continued downward movement of guide 60 and with it wedge members 48 and 50 force upper rollers 72 and 74 to move within cam slots 86 and 88 and lower rollers 78 and 80 to move within cam slots 82 and 84 to guide seal cups 66 and 68 to move radially apart and towards their sealed positions as shown in FIG. 7.

The translation of seal cups 66 and 68 from their open positions as shown in FIG. 5 to their closed positions as shown in FIGS. 6 and 7 is achieved by four separate but cooperative actions. First is the action of divider guides 114 against runners 116. Second, the bottom ends of wedge members 48 and 50 engage the top edges of the rearward surfaces of the seal cups to urge them apart. Third, the action of cam surfaces formed in lower support 54 and top support 62 guide the displacement of the seal cups away from each other. Fourth, the wedge surfaces of wedge member 48 and 50 slide against the rearward surfaces of seal cups 66 and 68 forcing the seal cup into metal-to-metal sealing relationship with the toroidal collars 12 and 14 as seen in FIG. 7. The first, second and third actions listed herein are primarily guiding actions. The actual sealing forces of the seal cups against the toroidal collars are achieved by the action of the wedge members 48 and 50 against the rearward surfaces of the sealing cups.

Referring to FIGS. 8A and 8B, the systems and methods that are employed in the insertion of pipe sealing assembly 46 into and removing it out of the containment housing surrounding pipe 10 is illustrated. As shown in FIG. 8B, there is affixed to the upper surface 45 of flange member 36 a valve 124 that has a lower flange 126 and an upper flange 128. Lower flange 126 is secured to the upper surface 45 of flange member 36. Valve 124 functions to open and close passageway 130 therethrough to enable different operating systems to be inserted into or removed from the interior of the containment housing surrounding pipe 10. The internal working portions of valve 124 are not shown but the use of valves in systems for tapping pipelines under pressure are well known.

An adaptor casing 132 has a lower flange 134 that is secured to plugging tool upper flange 128. Further, adaptor casing 132 has an upper flange 136 seen in FIG. 8A. Secured to upper flange 136 is a hydraulic cylinder adaptor 138 and secured to a hydraulic cylinder 140 that receives therein a slidable piston 142. The upper end of hydraulic cylinder 140 receives closure member 144.

Affixed to piston 142 is a piston rod 146 that extends to a sealable opening 148 in adaptor 138. The lower end of piston rod 146 is attached to the upper end of a tubular piston rod extender 150, the lower end of which is secured to the pipe sealing assembly top plate 52. In this manner, insertion or removal of pipe sealing assembly 46 is controlled by the actuation of piston 142 and thereby piston rod 146.

It is important that pipe sealing assembly 46 be accurately rotationally positioned with respect to the pipe ends 42 and 44 when it is inserted within the containment housing so that the seal cups 66 and 68 will properly align to form a sealing relationship with collars 12 and 14. Normally a piston and piston rod operating within a cylinder have no means for maintaining rotational relationship with the cylinder. To alleviate this problem and to provide for accurate alignment of the pipe sealing assembly when it is inserted into a containment housing to seal the opposed ends of a pipe, the cylinder 140 and piston 142 of this invention operate in a system that ensure their rotational relationship. For this purpose there is provided within the interior of hydraulic cylinder 140 first and second guide rods 152 and 154. The upper ends of guide rods 152 and 154 are secured to closure member 144 while the lower ends are received within recesses formed in adapter 138. Piston 142 has passageways 156 and 158 therein that sealably receive guide rods 152 and 154. In this way, piston 142 can be displaced by fluid pressure to move axially within cylinder 140 while guide rods 152 and 154 prevent the piston from rotating relative to the cylinder. FIG. 9 shows the relationship between guide rods 152 and 154 and piston 142.

By reference to FIGS. 8A and 8B the method of operation of the system of this invention to provide high temperature closure of pipe 10 can be seen. By application of hydraulic pressure to cylinder 140, piston 142 can be forced downwardly, moving piston rod 146 and thereby tubular piston rod extender 150 downwardly so that the attached pipe sealing assembly 46 is moved into the interior of the assembly surrounding pipe 10. When the assembly reaches its lowest level as defined by stop post 92 further downward force on the assembly initiates the movement of seal cups 66 and 68 away from each other and towards the plugging tool closed condition as shown in FIGS. 6 and 7. This action is achieved by four separate but cooperative actions as previously mentioned. First, divider guides 114 act against runners 116 to spread the cups apart. Then, the bottom ends of wedge members 48 and 50 engage the top edges of the rearward surfaces of the seal cups to urge them apart. In addition, the action of cam surfaces formed in lower support 54 and top support 62 guide the displacement of the seal cups away from each other. Finally the wedge surfaces of wedge member 48 and 50 slide against the rearward surfaces of seal cups 66 and 68 forcing them into metal-to-metal sealing relationship with toroidal collars 12 and 14 as seen in FIG. 7.

The pipe sealing assembly 46 is left in the double block and bleed position as shown in FIG. 7 as long as it is necessary to block fluid flow through pipe 10. When the need for blockage of flow through the pipe has ended the pipe sealing assembly 46 can be withdrawn and valve 124 closed. After removing the pipe sealing member 46, a completion plug (not shown) can be inserted through the valve and into passageway 40 within flange member 36. By mechanisms controlled through valve 124 the completion plug can be actuated to permanently close opening 40 through flange 36. Thereafter pressure is contained within the containment assembly that surrounds pipe 10 and valve 124 can be removed. A flange plate can be then secured to flange member 36 top surface 45 and thereafter flow through pipe 10 can continue indefinitely.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of plugging a pipeline employing a cam-assisted, wedge actuated, metal-to-metal seal, block and bleed plugging tool comprising the steps of:
   (a) sealably securing onto the exterior of the pipeline first and second spaced apart collars, each collar having a sealing face in a plane perpendicular the pipeline axis;
   (b) cutting and removing a length of pipeline from between said collars leaving two open pipe ends;
   (c) positioning first and second seal cups between said collars, each seal cup having on a forward face a forwardly extending circumferential lip of internal diameter greater than the external diameter of the pipeline, each seal cup having a top and a bottom cam followers; and
   (d) moving opposed sides of a wedge against rearward faces of said seal cups to force said seal cups apart from each other and said circumferential lips thereof into metal-to-metal sealing engagement with said sealing faces of said collars, closing said pipe.

2. A method of plugging a pipeline according to claim 1 employing said top and bottom cam followers to guide the movement of said seal cups as said wedge is forced between rearward faces of said seal cups.

3. A method of plugging a pipeline according to claim 1 including:
   retaining said seal cups between a top support and a bottom support, the top support having a pair of opposed cam slots therein slidably receiving said top cam follower of each said seal cup and the bottom support having a pair of opposed cam slots therein slidably receiving the bottom cam follower of each seal cup; and
   forcing said top and bottom supports towards each other to guide said seal cups away from each other.

4. A method of plugging a pipeline according to claim 3 wherein said seal cups, said top support and said bottom support and said wedge are transported as an assembly into and out of positions between said collars.

5. A method of plugging a pipeline according to claim 1 wherein steps (b), (c) and (d) are carried out within a containment housing secured to said collars.

6. A method of plugging a pipeline according to claim 4 wherein said assembly is transported into and out of position between said collars by means of a rod moved by a piston reciprocated within a cylinder.

7. A method of plugging a pipeline according to claim 6 wherein said rod moved by said piston reciprocated within a cylinder is laterally movable but non-rotatably supported relative to said cylinder.

8. Apparatus for sealing openings through opposed first and second spaced apart paralleled toroidal collars having facing planar toroidal sealing surfaces employing a cam-assisted, wedge actuated, metal-to-metal plugging tool comprising:

a pair of seal cups each having a forward face having a circumferential seal surface dimensioned to fit said toroidal sealing surfaces;

upper and lower cam followers affixed to each said seal cup rearwardly of said forward faces;

a top and a bottom support each having a pair of cam slots for receiving said cam followers and configured to guide said seal cups towards and away from said toroidal sealing surfaces;

translation apparatus for moving said top and bottom supports towards and away from each other to thereby guide said seal cups towards and away from said toroidal sealing surfaces; and a wedge forcably positionable between rearward surfaces of said seal cups.

\* \* \* \* \*